(No Model.) 2 Sheets—Sheet 1.
O. B. SCHIER.
APPARATUS FOR PASTEURIZING AND STERILIZING MILK, &c.
No. 605,920. Patented June 21, 1898.
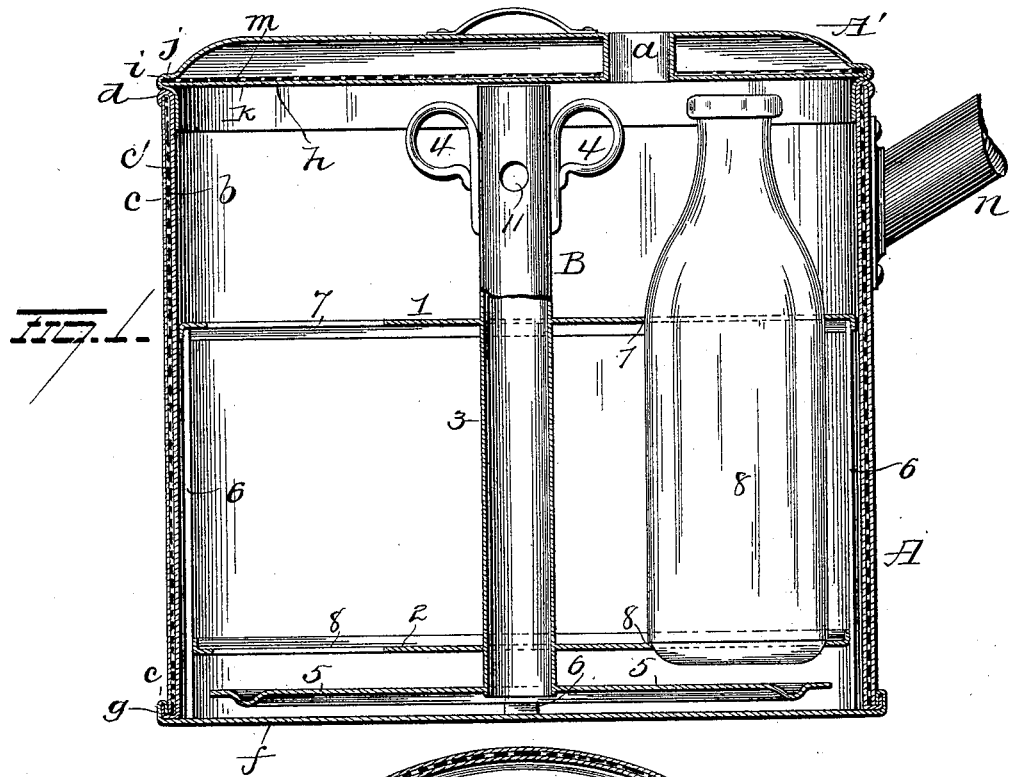
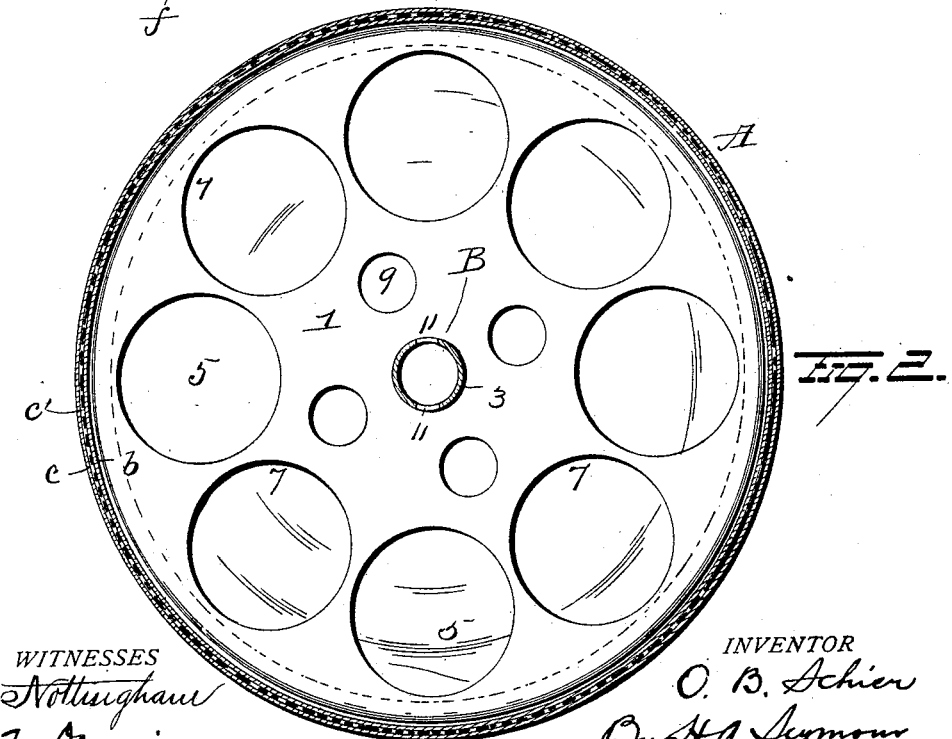
WITNESSES
E. J. Nottingham
G. F. Downing
INVENTOR
O. B. Schier
By H. A. Seymour
Attorney
THE NORRIS PETERS CO., PHOTO-LITHO., WASHINGTON, D. C.

(No Model.) 2 Sheets—Sheet 2.
O. B. SCHIER.
APPARATUS FOR PASTEURIZING AND STERILIZING MILK, &c.
No. 605,920. Patented June 21, 1898.
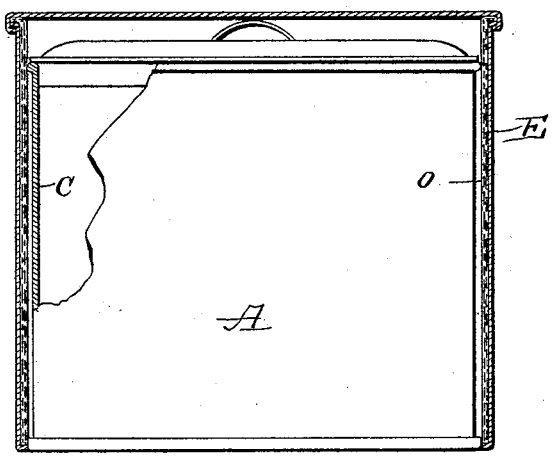
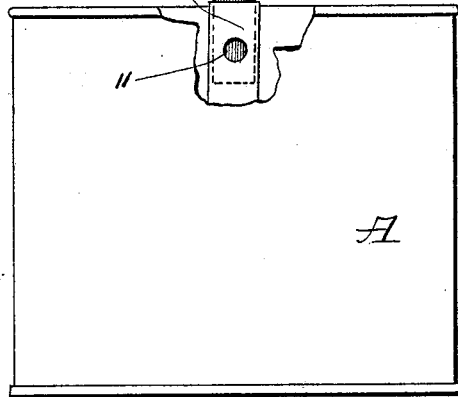

UNITED STATES PATENT OFFICE.

OSCAR B. SCHIER, OF BALTIMORE, MARYLAND, ASSIGNOR TO H. F. MILLER & SON, OF SAME PLACE.

APPARATUS FOR PASTEURIZING AND STERILIZING MILK, &c.

SPECIFICATION forming part of Letters Patent No. 605,920, dated June 21, 1898.

Application filed December 28, 1897. Serial No. 663,970. (No model.)

*To all whom it may concern:*

Be it known that I, OSCAR B. SCHIER, a resident of Baltimore, in the State of Maryland, have invented certain new and useful Improvements in Apparatus for the Pasteurization and Sterilization of Milk and other Liquids; and I do hereby declare the following to be a full, clear, and exact description of the invention, such as will enable others skilled in the art to which it appertains to make and use the same.

My invention relates to an improvement in apparatus for the pasteurization and sterilization of milk and other liquids.

It is becoming more and more evident that sterilized milk as a food for infants is not only of little value, but on account of the caseins and albumins being rendered more indigestible it has in many cases proven directly injurious to infants. It has been found that various abnormal symptoms present themselves after the use of sterilized milk, due to insufficient nutrition. For this reason pasteurization is now almost universally recommended for infant food, while sterilization only should be used in cases of acute troubles of the digestive organs. Pasteurization consists in rapidly heating the liquid to a temperature ranging between 155° and 165° Fahrenheit and in the immediate cooling of the liquid to a temperature not favorable to the growth of microscopic organisms after it has been exposed for a given length of time to the first-named higher temperature. In this rapid change of temperature lies the main obstacle in the way of successful pasteurization and especially a very great danger of breaking the glass containers of the liquid to be pasteurized. Much difficulty has been encountered in providing a practical apparatus by means of which the pasteurization of milk can be successfully accomplished, and the production of such an apparatus is the object of my invention.

A further object is to so construct the apparatus that it shall be simple, so that it shall be capable of successful domestic use, and an apparatus which shall be effectual in all respects in the performance of its functions.

With these objects in view the invention consists in certain novel features of construction and combinations and arrangement of parts, as hereinafter set forth, and pointed out in the claims.

In the accompanying drawings, Figure 1 is a sectional view illustrating my invention. Fig. 2 is a horizontal section. Fig. 3 is an elevation. Fig. 4 is a view illustrating a modification.

A represents a boiler, which may be made of tin and preferably provided with a copper bottom. The boiler is provided with a tight-fitting cover A', having a hole $a$ for the accommodation of a thermometer, by means of which the temperature of the water within the boiler can be readily ascertained.

In constructing the boiler A, I prefer to employ two shells $b$ $c$ and an interposed filling $c'$, of asbestos or other heat-non-conducting material. This filling between the shells of the cylinder may be sheet asbestos or it may be other non-conducting material in a fine or divided form. The upper edge of the inner shell $b$ is curled or bent outwardly, so as to embrace the upper edge of the outer shell, as shown at $d$, so as to hold the two shells tightly together, and the lower edge of the inner shell is similarly bent to embrace the lower edge of the outer shell, as shown at $e$, and thus the two shells and the interposed non-conducting material will be held closely associated. The bottom $f$ of the boiler is made with a peripheral flange $g$, which embraces the lower edge of the boiler and is preferably soldered inside the latter to prevent leakage. The cover A' of the boiler is provided with a flange $h$, disposed inwardly from the outer or peripheral edge thereof, so as to form a small flange or peripheral projection $i$ to rest on the upper edge of the boiler when the flange $h$ enters the latter. The cover might, if desired, be constructed to fit over instead of into the upper end of the boiler. By bending the metal of the cover so as to dispose the flange $h$ inwardly from the peripheral edge thereof a groove $j$ will be formed between the upper edge of the flange $h$ and the edge of the body of the cover. In this groove the peripheral edge of a metal (preferably tin) disk $k$ is inserted, and between said disk and the body of the cover a disk of asbestos or other heat-non-conducting material $m$ is placed, the periphery of which is also inserted in the groove $j$. When the peripheral flange $i$ is mashed down, the disks $k$ and $m$ will be tightly held in place. With a boiler thus constructed the contents can be rapidly heated and the heat will be properly confined therein for a requisite length of time.

In order to provide means whereby to readily handle the boiler, it will be provided with a suitable bail or handle $n$.

A rack B is adapted to be removably located within the boiler. The rack comprises two disks 1 2, spaced apart and secured centrally to a tubular post 3, which extends some distance above the upper disk 1, and is provided at or near its upper end with finger-pieces or loops 4. The tubular post 3 projects a short distance below the lower disk and is secured to a third disk 5. The disks 1 and 2 are connected together at their peripheries by means of uprights 6, which project below the lower disks 2 and 5 and rest on the bottom of the boiler, the uprights thus serving as legs to elevate the lower disk 5 slightly above said bottom of the boiler. The disks 1 and 2 are made with alined holes 7 8, respectively, for the accommodation of bottles for containing milk or other liquids, and said disks 1 2 are also provided with smaller holes 9 to permit the circulation of water. The tubular post 3 is also provided with holes 11 near its upper end to permit free circulation of the hot water used for pasteurization of the liquid in the bottles.

For the purpose of rapidly cooling the milk or other liquid the hot water will be driven off by means of cold water run through the tubular post by means of a bent pipe 15, having a funnel 16, said pipe being inserted into the upper end of the tubular post to a sufficient extent to close the holes 11 therein.

The process of pasteurization with my improved apparatus is very simple and is as follows: First, fill the bottle with liquid (milk, &c.) to be pasteurized. Seal the bottles loosely with their stoppers, so that the air may escape during the process, and place them in the rack or holder. The rack or holder containing the bottles will then be placed in the boiler and the latter supplied with water to a point in proximity to the holes 11 in the tubular post. The thermometer will then be passed through the hole in the cover A' of the boiler and permitted to project into the boiler and through one of the holes in the rack, so that the bulb will be immersed. The boiler will then be placed on a hot stove. When a temperature of 155° or 165° shall have been reached, the apparatus will be removed from the stove and put on a disk of asbestos or other heat-non-conducting material, which has been slightly or moderately heated on the end of the stove, where it will be left for twenty-five or thirty minutes. After this length of time the thermometer is removed, and the boiler will then be placed in the kitchen-sink or other suitable place. The cover of the boiler will be removed and the bent pipe 15 placed in the upper end of the tubular post 3. The pipe will be turned until the funnel 16 is directly under the cold-water spigot. Cold water will then be allowed to slowly enter the apparatus through the pipe 15 and tubular post 3 and being discharged at the lower end thereof under the tray or holder will force the hot water up between the bottles and over the upper edge of the boiler. When the bottles in the holder shall have become sufficiently cooled to permit the immersion of the hand into the water, the cold water will be allowed to flow in greater volume from the spigot, and after about fifteen minutes the bottles and milk will be cooled to the temperature of the water, when they may be placed on ice without any risk of breakage.

By means of my improved apparatus the milk or other liquid can be quickly and evenly heated, the operator is enabled to watch and ascertain the correct temperature, the milk can be quickly cooled without danger of breaking the bottles, and the apparatus is effectual in all respects in the performance of its functions.

In sterilizing milk or other liquid it is necessary to let the water come to the boiling-point on the stove, which will be about 212° Fahrenheit. The apparatus will be kept on the stove and the water kept boiling for twenty-five or thirty minutes and then cooled in the same way as in the pasteurizing process above described. It will be observed that the difference between the process of pasteurization and sterilization is that in the former the apparatus is taken from the stove immediately upon reaching a certain temperature and kept at that temperature, while in the latter the water is allowed to boil twenty-five or thirty minutes and immediately cooled after removal of the apparatus from the stove.

Instead of making the boiler and its cover with double walls and interposed non-conducting material they may be made of a single thickness of material, as at C, and inclosed during the time the apparatus is heated by a removable envelop E, made of tin and having a lining $o$, of asbestos or other heat-non-conducting material.

Various other slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. The combination with a boiler, of a rack adapted to contain bottles and support them above the bottom of the boiler, a pipe within the boiler and open at both ends, the lower end of said pipe terminating above the bottom of the boiler, a cover on the boiler and extending over the upper end of said pipe and means for confining heat within the boiler, substantially as set forth.

2. The combination with a boiler, of a rack adapted to support bottles in the boiler, and a tubular post forming part of said rack and communicating with the boiler under the rack, said tubular post having holes above the supporting-disks of the rack, substantially as set forth.

3. The combination with a boiler, of a rack adapted to support bottles above the bottom of the boiler, a tubular post open at both ends forming part of the rack, a bent pipe adapted to be detachably connected with said tubular post and a funnel at the upper end of said pipe, substantially as set forth.

4. The combination with a boiler, of a rack adapted to be removably placed therein, said rack comprising perforated disks, spaced apart and an unperforated disk below the lower perforated disk, uprights connecting said disks and projecting below the lower disk and adapted to form legs for the rack, and a tubular post secured to said disk and open at both ends, substantially as set forth.

5. The combination with a boiler comprising two shells and interposed heat-non-conducting material, of a cover for the boiler having a depending flange and a groove between said depending flange and the body of the cover, and two disks placed in said groove, one of said disks being of metal and the other being of heat-non-conducting material, substantially as set forth.

In testimony whereof I have signed this specification in the presence of two subscribing witnesses.

OSCAR B. SCHIER.

Witnesses:
A. J. SCOPINICH,
HARRY CRAVER.